(12) United States Patent
Jaggi

(10) Patent No.: US 6,973,441 B1
(45) Date of Patent: Dec. 6, 2005

(54) METHOD AND APPARATUS FOR MANAGING ACCOUNTS PAYABLE

(75) Inventor: Sandeep Jaggi, San Jose, CA (US)

(73) Assignee: LSI Logic Corporation, Milpitas, CA (US)

( * ) Notice: Subject to any disclaimer, the term of this patent is extended or adjusted under 35 U.S.C. 154(b) by 204 days.

(21) Appl. No.: 09/758,909

(22) Filed: Jan. 10, 2001

(51) Int. Cl.[7] ............................................. G06F 17/60
(52) U.S. Cl. ............................................. 705/40; 705/36
(58) Field of Search ................................... 705/25–46

(56) References Cited

U.S. PATENT DOCUMENTS

| | | | |
|---|---|---|---|
| 5,223,699 A * | 6/1993 | Flynn et al. .................. | 705/40 |
| 5,325,290 A * | 6/1994 | Cauffman et al. ............ | 705/40 |
| 5,875,431 A * | 2/1999 | Heckman et al. ............. | 705/7 |
| 5,915,241 A * | 6/1999 | Giannini ....................... | 705/2 |
| 5,956,690 A * | 9/1999 | Haggerson et al. ........... | 705/3 |
| 6,341,265 B1 * | 1/2002 | Provost et al. ................ | 705/4 |
| 6,493,685 B1 * | 12/2002 | Ensel et al. ................... | 705/40 |

FOREIGN PATENT DOCUMENTS

WO      WO 99/23589      *   5/1999

OTHER PUBLICATIONS

Tom C. Davis, "PM software—managing, and more", Accounting Technology, Boston: 2001, p. 22, 5 pages.*

* cited by examiner

*Primary Examiner*—Frantzy Poinvil
(74) *Attorney, Agent, or Firm*—Christopher P. Maiorana, P.C.

(57) ABSTRACT

The present invention is a method for operating a computer-based accounts payable system. The user inputs a bill that includes a billing code. The system then determines whether the billing code is present in the budget database. If the billing code is present in the budget database, the system approves payment of an amount associated with the billing code in the budget database. If the billing code is not present in the budget database, the system approves payment of a budget amount associated with the billing code in a default budget database. In the preferred embodiment, the system also checks whether a particular task has been completed before approving payment of said bill, and checks to insure that a previous bill covering the same task has not been paid previously.

25 Claims, 4 Drawing Sheets

| Billing Code | Description | Amount |
|---|---|---|
| P-USP | Preparation and filing of original U.S. patent application | 7,000 |
| P-OAI | Preparation of response to first non-final office action | 2,000 |

| Billing Code | Description | Amount |
|---|---|---|
| P-USP | Preparation and filing of original U.S. patent application | 7,000 |
| P-OAI | Preparation of response to first non-final office action | 2,000 |

METHOD AND APPARATUS FOR MANAGING ACCOUNTS PAYABLE

BACKGROUND OF THE INVENTION

Field of the Invention

The present invention relates to managing projects. The invention is particularly useful in connection with the management of projects comprising multiple, serial events.

SUMMARY OF THE INVENTION

The foregoing summary is intended merely to provide a brief description of the general nature of the invention. A more complete understanding of the invention can be obtained by referring to the claims and the following detailed description of the preferred embodiments in connection with the accompanying figures.

The present invention is an event based project management system that combines task management and budget control. The system is flexible and allows the user the ability to change easily parameters and database entries. In the preferred embodiment, the present invention is utilized by in-house intellectual property counsel to manage intellectual property prosecution, including manage the company's intellectual property prosecution budget and the work of outside counsel.

The present invention allows the user to input data concerning a project and associate individuals with the project. The system can determine a deadline for completing a task associated with the project and send out reminders accordingly. The system provides the user a number of options not available on the conventional project management systems. For example, reminders automatically can be transmitted with increasing frequency as a deadline approaches. The system can also automatically increase the number of individuals to whom the reminders are sent as the deadline draws near. It can also vary the mode or modes by which reminders are communicated, such as first by e-mail and later by both e-mail and voice mail.

The present invention also operates a computer-based accounts payable system. The user inputs a bill that includes a billing code. The system then determines whether the billing code is present in a budget database. If the billing code is present in the budget database, the system approves payment of an amount associated with the billing code in the budget database. If the billing code is not present in the budget database, the system approves payment of a budget amount associated with the billing code in a default budget database. In the preferred embodiment, the system also checks whether a particular task has been completed before approving payment of said bill, and checks to insure that a previous bill covering the same task has not been paid previously.

The system allows a user to select a first action such that the first action will be performed by the system automatically upon the occurrence of a first predetermined event. The system also allows the user to select a second action such that the second action will be set into place by the system automatically upon the occurrence of the first predetermined event and will be performed by the system automatically upon the occurrence of a second predetermined event. The first predetermined event can be the input of predefined data into the system, including the input of data indicating that another event has previously occurred. The second predetermined event can be the system determining that a specified date has been reached. The second action can include sending a reminder electronically to complete a task, including sending an automated voice mail.

DESCRIPTION OF THE PREFERRED EMBODIMENTS

Figure 1:
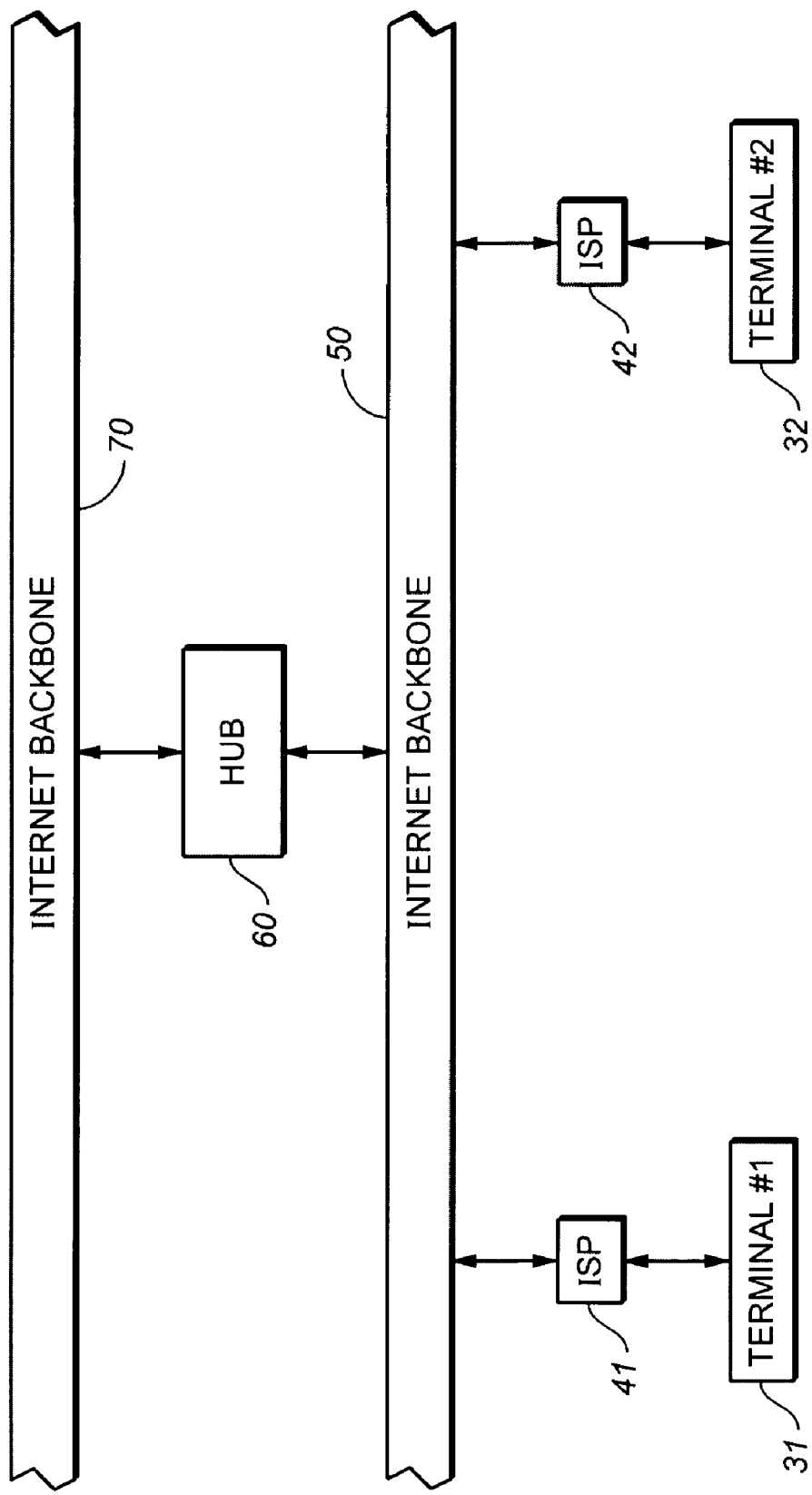
FIG. 1 is a block diagram of an environment in which the present invention can be practiced.

The following description explains certain representative embodiments of the invention. While these embodiments are provided to explain the general nature of the invention, it should be understood that the present invention is not limited only to the discussed embodiments.

A. Glossary of Applicable Internet Terms

Although the present invention is not limited to such, the preferred embodiment of the present invention operates in the environment of the Internet. It can also operate by virtue of an intranet, extranet or other computer network environment. The following glossary of terms, although well known to those skilled in the applicable art, is useful with respect to understanding and comprehending the nature of the preferred embodiment:

Browser: A program used to view, download, upload, surf or otherwise access documents (pages) on the World Wide Web.

Button: A graphic that a user can "click on" to do something, such as download a program or go to another Web page.

Client: A machine that provides commands to a server, and is serviced by the server.

Extranet: The connecting of two or more intranets.

Database: A file composed of records, each containing fields together with a set of operations for searching, sorting, recombining, and other functions.

Database Engine: The program module or modules that provide access to a database management system (DBMS).

Database Management System: A software interface between the database and the user. A database management system handles user requests for database actions and allows for control of security and data integrity requirements.

Database Server: A network node, or station, dedicated to storing and providing access to a shared database.

Document: When used in reference to the World Wide Web, a document is any file containing text, media or hyperlinks that can be transferred from an HTTP server to a client program.

Electronic Mail or E-mail: Messages automatically passed from one computer user to another, often through computer networks and/or via modems over telephone lines.

File: A collection of data or information that has a name, generally called the "filename." Almost all information stored in a computer must be in a file. There are many different types of files: data files, text files, program files, directory files, and so on. Different types of files store different types of information. For example, program files store programs, whereas text files store text.

Home Page: A multi-media table of contents that guides a Web user to stored information on the Internet. A web site has a home page generally available to the public over the WWW.

HyperText Markup Language (HTML): HTML is the language commonly used by Web servers to create and connect documents that are viewed by Web clients. HTML uses Hypertext documents. Currently, technological improvements are currently under development in the form of XML. The preferred embodiment of the present invention includes a web site containing documents created and connected by HTML or XML.

Intranet: A private network inside a company or organization that uses the same kinds of software that you would find on the public Internet, but that is only for internal use. As the Internet has become more popular many of the tools used on the Internet are being used in private networks, for example, many companies have Web servers that are available only to employees. Note that an "Intranet" may not actually be an Internet, it may simply be a network.

Internet ("the Net"): A connection system that links computers worldwide in a network.

IP: A unique number that identifies a particular computer in a network of computers.

Link: Text and/or an image area on a Web page that a user can click on to "connect to" or reference another document. There are many possibilities of what that document can be. Most commonly links are thought of as what connects two Web pages or Web sites. They can also however be referencing a different part of the same document, linking to a file which will download to your computer or triggering the launching of an external or helper application which will then process the clicked on file.

Mailbox: The directory on a host computer where e-mail messages are stored.

Menu: A list from which the user may select an operation to be performed. This is often done with a mouse or other pointing device under a graphical user interface but may also be controlled from the keyboard.

Mouse: The most commonly used computer pointing device, first introduced in 1968. The mouse is a device used to manipulate an on-screen pointer that is generally shaped like an arrow. With the mouse in hand, the computer user can select, move, and change items on the screen.

Password: A secret combinations of letters and other symbols needed to login to a computer system.

Server: A machine (computer) that performs a task at the command of another machine ("client"). In the context of the present invention, a server's primary function is to facilitate distribution of information over the Web.

URL: Universal Resource Locator, a Web document version of an e-mail address, in character string form, that uniquely identifies a document, application, or tool available over the Web. The description of the preferred embodiments describes a web site with multiple pages, including a home page. These are all accessible via an appropriate URL.

Web Browser: A program running on a user-operated client computer.

Web Page: <World-Wide Web> A block of data available on the World-Wide Web, identified by a URL. In the simplest, most common case, a web page is a file written in HTML, stored on the server. It may refer to images which appear as part of the page when it is displayed by a web browser. It is also possible for the server to generate pages dynamically in response to a request, e.g. using a CGI script.

Web Site: A home and/or location on the World Wide Web. A place made up 20 of Web pages. These pages can contain graphics, text, audio, video and other dynamic and/or static materials.

Welcome Page: The introductory Web page for a Web site, also referred to as the home page. The first page of a Web site to contain some welcome and/or navigation information about the Web site.

World Wide Web (WWW or "the Web"): The Internet's application that lets people seeking information on the Internet switch from server to server and database to database by clicking on highlighted words, icons, images or phrases of interest. An Internet Web server supports clients and provides information.

XML or extensible Markup Language: A programming language/specification developed by the W3C. XML is a pared-down version of SGML, designed especially for Web documents. It enables Web authors and designers to create their own customized tags to provide functionality not available with HTML.

B. Remote Terminal And Network

FIG. 1 is a block diagram illustrating the structure of the preferred network in which the present invention operates. Shown in FIG. 1 are terminals 31 and 32, each of which may comprise an ordinary computer workstation, a laptop computer, or special-purpose computing equipment. Terminals 31 and 32 communicate with Internet service providers (ISPs) 41 and 42 via a telephone connection, such as by using a modem interface. ISPs 41 and 42, in turn, connect to Internet backbone 50 via their respective routers (not shown). Specifically, ISP 41 receives Internet messages from terminal 31 and then routes them onto Internet backbone 50. Also, ISP 41 pulls messages off Internet backbone 50 that are addressed to terminal 31 and communicates those messages to terminal 31 via the telephone connection. In a similar manner, terminal 32 also can communicate over the Internet through ISP 42. Of course, such terminals may also connect directly to Internet backbone 50 if provided with the appropriate routers and other hardware.

Figure 2:
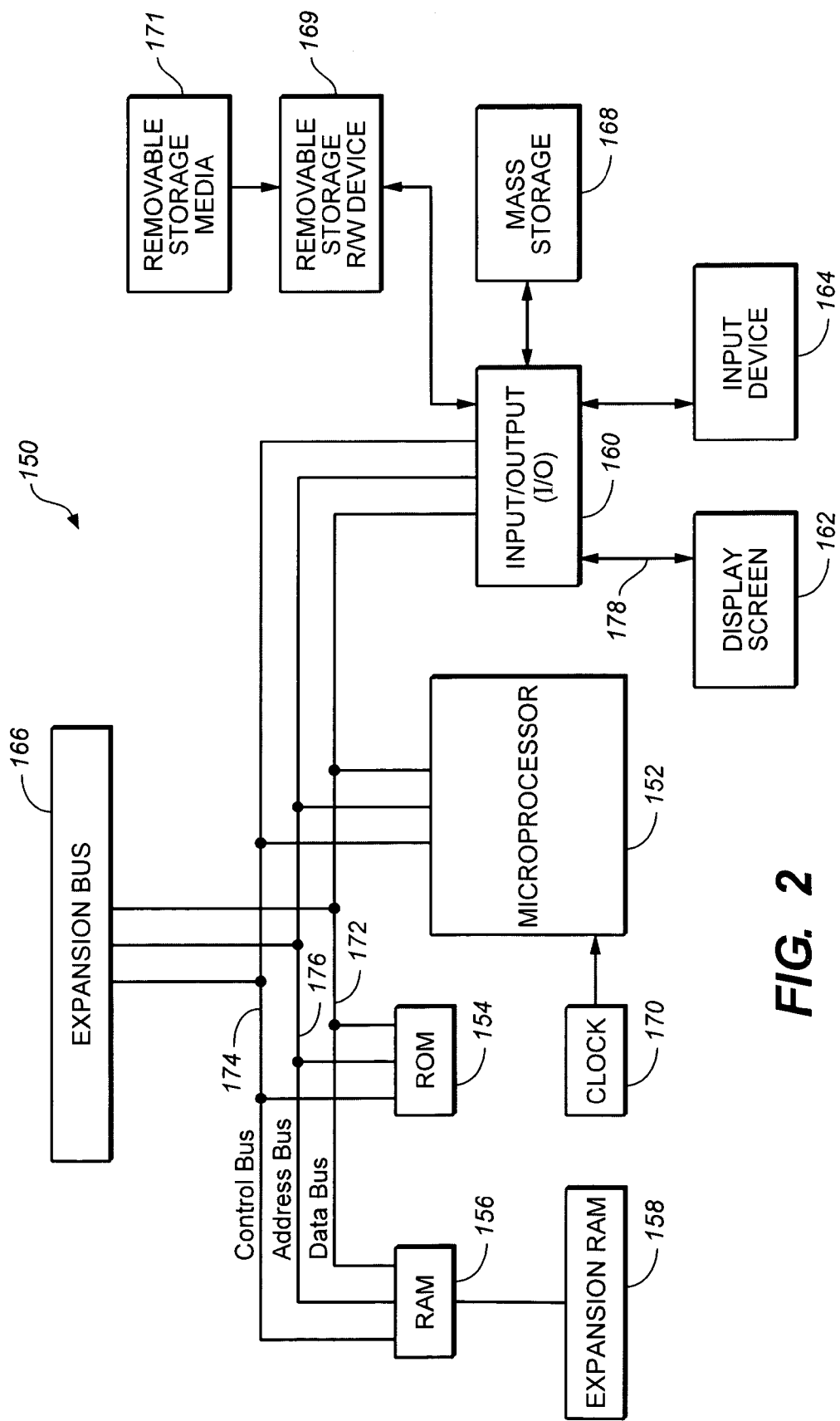
FIG. 2 is a block diagram of a general purpose computer system, representing one suitable computer platform for implementing the communication nodes illustrated in FIG. 1.

FIG. 2 illustrates a block diagram of a general purpose computer system which can be used to implement terminals 31 and 32. Specifically, FIG. 2 shows a general purpose computer system 150 for use in practicing the present invention. As shown in FIG. 2, computer system 150 includes a central processing unit (CPU) 152, read-only memory (ROM) 154, random access memory (RAM) 156, expansion RAM 158, input/output (I/O) circuitry 160, display assembly 162, input device 164, and expansion bus 166. Computer system 150 may also optionally include a mass storage unit 168 such as a disk drive unit or nonvolatile memory such as flash memory and a real-time clock 170.

CPU 152 is coupled to ROM 154 by a data bus 172, control bus 174, and address bus 176. ROM 154 contains the basic operating system for the computer system 150. CPU 152 is also connected to RAM 156 by busses 172, 174, and 176. Expansion RAM 158 is optionally coupled to RAM 156 for use by CPU 152. CPU 152 is also coupled to the I/O circuitry 160 by data bus 172, control bus 174, and address bus 176 to permit data transfers with peripheral devices.

I/O circuitry 160 typically includes a number of latches, registers and direct memory access (DMA) controllers. The purpose of I/O circuitry 160 is to provide an interface between CPU 152 and such peripheral devices as display assembly 162, input device 164, and mass storage 168.

Display assembly 162 of computer system 150 is an output device coupled to I/O circuitry 160 by a data bus 178.

Display assembly 162 receives data from I/O circuitry 160 via bus 178 and displays that data on a suitable screen.

The screen for display assembly 162 can be a device that uses a cathode-ray tube (CRT), liquid crystal display (LCD), or the like, of the types commercially available from a variety of manufacturers. Input device 164 can be a keyboard, a mouse, a stylus working in cooperation with a position-sensing display, or the like. The aforementioned input devices are available from a variety of vendors and are well known in the art.

Some type of mass storage 168 generally is considered desirable. However, mass storage 168 can be eliminated by providing a sufficient mount of RAM 156 and expansion RAM 158 to store user application programs and data. In that case, RAMs 156 and 158 can optionally be provided with a backup battery to prevent the loss of data even when computer system 150 is turned off. However, it is generally desirable to have some type of long term mass storage 168 such as a commercially available hard disk drive, nonvolatile memory such as flash memory, battery backed RAM, PC-data cards, or the like.

A removable storage read/write device 169 may be coupled to I/O circuitry 160 to read from and to write to a removable storage media 171. Removable storage media 171 may represent, for example, a magnetic disk, a magnetic tape, an opto-magnetic disk, an optical disk, or the like.

In operation, information is input into the computer system 150 by typing on a keyboard, manipulating a mouse or trackball, or "writing" on a tablet or on a position-sensing screen of display assembly 162. Also, voice activation means can be utilized to input information into the computer system 150. CPU 152 then processes the data under control of an operating system and an application program, such as a program to perform steps of the inventive method described below, stored in ROM 154 and/or RAM 156. CPU 152 then typically produces data which is output to the display assembly 162 to produce appropriate images on its screen.

Expansion bus 166 is coupled to data bus 172, control bus 174, and address bus 176. Expansion bus 166 provides extra ports to couple devices such as network interface circuits, modems, display switches, microphones, speakers, etc. to CPU 152. Network communication is accomplished through the network interface circuit and an appropriate network.

Suitable computers for use in implementing the present invention may be obtained from various vendors. Various other types of computers, however, may be used depending upon the size and complexity of the required tasks. Suitable computers include mainframe computers, multiprocessor computers, workstations or personal computers.

In use, the computer-executable process steps according to the present invention typically initially are stored in mass storage 168, downloaded from mass storage 168 to RAM 156, and then executed by microprocessor 152 out of RAM 156. The process steps according to the present invention may also be stored on any form of computer-readable medium, including solid state memory devices such as RAM and ROM, optical storage devices such as CD-ROM and DVD, and magnetic storage devices such as hard disks, floppy disks, magnetic tapes and others.

Also connected to Internet backbone 50 is a hub 60. As discussed in more detail below, one function performed by the hub 60 is to retrieve messages sent over the Internet 50, process those instructions, and communicate with a central home controller. For this purpose, hub 60 also is connected to wide area network (WAN) 70.

Although terminals 31 and 32 are shown in FIG. 1 as being attached to hub 60 via the Internet 50, other methods can also be used for communicating between remote terminals and the hub, such as by utilizing a direct modem/telephone line dial-in connection, a wide area network, a local area network (LAN), or any other communication system. Furthermore, different terminals may be connected to hub 60 via different communication systems.

Preferably, the hub 60 will maintain a web site on the World Wide Web (WWW) serving as a host server, or may maintain a site that is connected through the Internet but not through the WWW. In this respect, the hub 60 functions as a web site host server.

It should be noted that a system implementing the present invention can be configured in many different ways and still be within the scope of the invention. The specific embodiments described herein are examples only.

The benefit of maintaining a web site on hub 60 is that the system can be utilized by multiple companies. As mentioned above, the preferred embodiment of this invention is a system and apparatus that manages intellectual property prosecution for a company. By providing such a system via a web site, the system can be made available to multiple companies.

C. Patent Prosecution Procedures.

As described more fully elsewhere, the present invention can manage projects of various types. However, in order to provide a more complete illustration of certain details of the present invention, the application of the present invention to the management of a company's patent prosecution is described. It should be noted that the present invention is by no means limited to the application of managing patent prosecution. It can be utilized to manage many different types of projects.

Nevertheless, since the context of patent prosecution management is utilized for discussion purposes herein, it is useful to provide a basic description of the basic procedures relating to the prosecution of patent applications. It should be noted, however, that the present invention can be utilized with respect to managing the protection of other types of intellectual property, such as trademark registration, or other types of projects unrelated to intellectual property protection.

For a larger technology company, individuals involved in the prosecution of a patent application generally includes individuals from inside the company and individuals from outside the company. Individuals from inside the company might include an inventor, the supervisor of the inventor, the head of the department or division (often a vice-president) to which the inventor and supervisor are assigned (the department head is generally above the supervisor within the context of corporate organization), an in-house patent attorney assigned to the patent application, and an in-house patent paralegal assigned to the patent application. Individuals from outside the company will generally include at least one patent attorney assigned to the patent application.

Generally, the patent process in a larger technology company will begin with the preparation of an invention disclosure by an inventor. An inventor disclosure will typically set forth pertinent information such as a description of the invention, the reasons why the invention is different than and an improvement over the prior art, and an assessment of the commercial potential value of the invention. The invention disclosure may have to be approved by either the inventor's supervisor or the head of the department before it moves forward in the patent prosecution process.

The invention disclosure is submitted to the company's patent department. An in-house patent attorney is then assigned to the invention disclosure and the in-house patent attorney reviews the invention disclosure to insure that the inventor has provided sufficient description of the invention and provided all necessary information. The in-house patent attorney then sends the invention disclosure to a patent committee.

The patent committee reviews the invention disclosure and determines whether a patent should be sought to protect the invention. The determining whether to approve an invention disclosure for patent protection, the patent committee may consider various factors, such as whether the invention fits within the company's business plans and whether the invention is a commercially significant improvement over the prior art.

If the invention disclosure is approved, an outside patent counsel is assigned the task of preparing a patent application. Typically, the outside patent counsel will be an attorney who is a member of a law firm that has a number of patent attorneys. Also, a large technology company frequently sends patent prosecution work to several different law firms. For example, patent prosecution work for a particular technology might be sent to one particular law firm, but patent prosecution work for another type of technology might be sent to a different law firm.

Generally, the outside patent attorney is provided the invention disclosure as a starting point, but the outside patent attorney will also interview the inventor to obtain further details regarding the invention and to insure that the invention is original to that inventor. The outside patent attorney will then prepare a draft patent application, which is sent to the inventor and the in-house patent attorney for review.

After receiving input from the inventor and the in-house patent attorney, the outside patent attorney finalizes the application and sends the final application to the inventor with a copy of the in-house patent counsel. The inventor reviews the final patent application, and if the final application meets the inventor's approval, executes an oath and assignment (assigning the patent application and the underlying invention to the company).

The patent application is then filed with the United States Patent and Trademark Office, which is an agency of the U.S. Department of Commerce. In discharging its duties, the Patent and Trademark Office examines applications and grants patents on inventions when applicants are entitled to them. A patent for an invention is a grant of a property right by the Government to the inventor (or his heirs or assignees), acting through the Patent and Trademark Office. Each patent is granted for a term of years and is subject to the payment of maintenance fees.

An application for a patent is made to the Commissioner of Patents and Trademarks and includes a written specification (description and claims), an oath or declaration, a drawing or drawings in those cases where such is necessary, and a filing fee. The written specification must include a title of the invention (which should be as short and specific as possible) and a brief "abstract" of the technical disclosure in the specification.

Applications filed in the Patent and Trademark Office and accepted as complete applications are assigned for examination to the respective examining groups having charge of the areas of technology related to the invention. In the examining group, applications are taken up for examination by the examiner to whom they have been assigned.

Many technology companies pay a bonus to the inventor or inventors when a patent application is filed. The purpose of such a bonus is to encourage scientists, engineers and other company employees to disclosure inventions to the company and to cooperate with respect to the preparation of patent applications.

The examination of the application consists of a study of the application for compliance with the legal requirements and a search through United States patents, prior foreign patent documents which are available in the Patent and Trademark Office, and available literature, to see if the claimed invention is new and unobvious. A decision is reached by the examiner in the light of the study and the result of the search.

The applicant is notified in writing of the examiner's decision by an "action" or "office action" that is normally mailed to the responsible patent attorney or agent. The reasons for any adverse action or any objection or requirement are stated in the action and such information or references are given as may be useful in aiding the applicant to judge the propriety of continuing the prosecution of his application. If the invention is not considered patentable subject matter, the claims will be rejected. If the examiner finds that the invention is not new, the claims will be rejected, but the claims may also be rejected if they differ only in an obvious manner from what is found. It is not uncommon for some or all of the claims to be rejected on the first action by the examiner; relatively few applications are allowed as filed.

Where the patent application is rejected, in whole or in part, the applicant must request reconsideration in writing, and must distinctly and specifically point out the supposed errors in the examiner's action. In amending an application in response to a rejection, the applicant must clearly point out why he/she thinks the amended claims are patentable in view of the state of the art disclosed by the prior references cited or the objections made. He/she must also show how the claims as amended avoid such references or objections.

The response of an applicant to an action by the Office must be made within a prescribed time limit. The maximum period for response is set at 6 months by the statute which, also provides that the Commissioner may shorten the time for reply to not less than 30 days. The usual period for response to an Office Action is 3 months. A shortened time for reply may be extended up to the maximum 6-month period. If no reply is received within the time period, the application is considered as abandoned and no longer pending.

If a patent application filed by a company is initially rejected, the in-house patent counsel must make a decision as whether to respond to the office action or to let the application go abandoned. Where the examiner has rejected the patent application based on prior art, and the rejection appears merited, the in-house patent attorney might determine to let the patent application go abandoned. If the rejection appears merited, but it appears that some narrow aspects of the invention deserve patent protection, the in-house counsel might determine that the patent claims should be amended. If the in-house patent attorney disagrees with the rejection, he or she might determine to traverse the rejection.

After response by the applicant the application will be reconsidered, and the applicant will be notified in writing if claims are rejected, or objections or requirements made, in the same manner as after the first examination. The second Office action usually will be made "final".

If, on examination of the application, or at a later stage during the reconsideration of the application, the patent application is found to be allowable, a notice of allowance will be sent to the applicant, or to applicant's attorney or agent and a fee for issuing the patent is due within three months from the date of the notice. The issue fee is due within three months after a written notice of allowance is mailed to the applicant. If timely payment is not made the application will be regarded as abandoned.

If the issue fee is paid, the patent will issue. Many technology companies pay inventors a bonus upon issuance of a patent. Again, this is to encourage employees to disclose inventions and to cooperate during the prosecution of patent applications.

D. Basic System Architecture.

In the preferred embodiment, the system is operated by a relational database management system interlinking a series of databases residing on a database server. Those databases can include the following:

1. Membership Information Database—includes data relating to companies and individuals who are authorized to have access to the system.

2. Event Engine Database—defines operation parameters of "Automated Response to Events"-type responses ("ARE") and "Automated Response to Action Items"-type responses ("ARAI"). In the preferred embodiment, the entries of the database can be modified by a user.

3. Global Events Database—includes data reflecting events that have occurred relative to the projects that are being managed by the system.

4. Calendar Database—includes data reflecting future events and tasks.

5. Default Task Budgets Database—includes billing codes and associated budget amounts.

6. Plurality of Firm Task Budget Databases—each firm task budget database includes billing codes and associated budget amounts.

7. Cost Budget Database—has related entries for generic costs with corresponding budget amounts and billing codes.

8. Authorization Database—includes data indicating the amounts that have been authorized for fees and charges.

9. Approved Payment Database—includes data indicating amounts that have been approved for payment to outside law firms.

10. Payment Database—includes data indicating amounts that have been paid to law firms for services rendered and costs incurred.

E. Home Page and Access to System.

Figure 3:
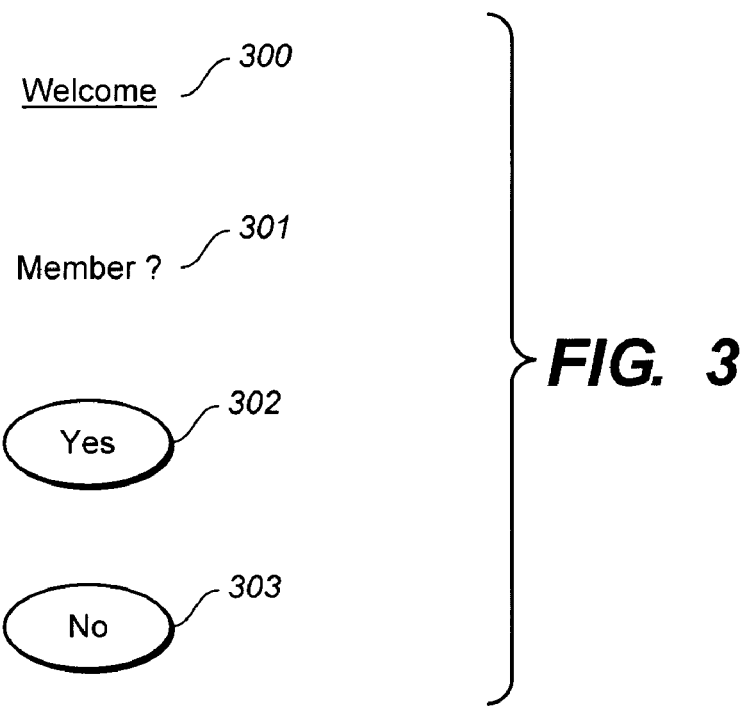
FIG. 3 is an exemplary welcome page.

Referring to FIG. 3, a "welcome page" or "home page" is shown. In the preferred embodiment of the present invention such a welcome page would be the initial page viewed by a user accessing the site. The welcome page, which bears the title "Welcome" 300, sets forth an inquiry 301 as to whether the user's company is a member. The welcome page also includes a menu with two buttons. The first button 302 links to a web page for members (an exemplary page of which is shown by FIG. 4).

The second button 303 links to a web page for non-members. By clicking on the second button 303, non-members will be presented with an application page that will allow them to apply for membership. Information gathered by such an application page would include, for example, a company name, the names of the individuals from the company that would be allowed access to the site, and credit information. Upon approval of the application, the company would be given a password and individual passwords for the individuals associated with the company that would be permitted access to the site.

Figure 4:
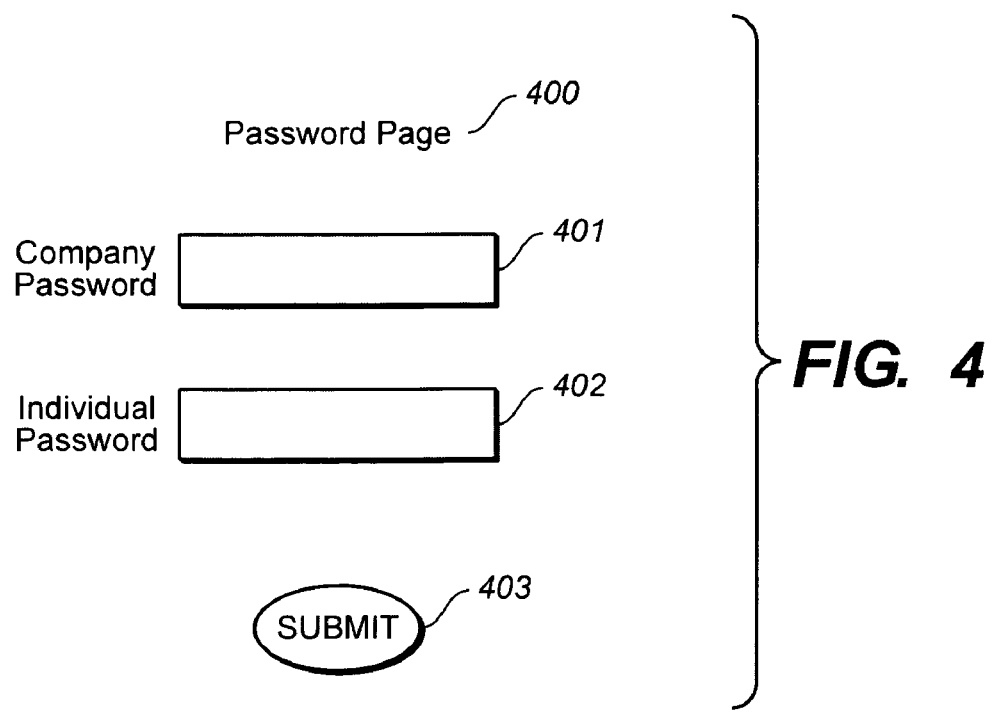
FIG. 4 is an exemplary password page.

FIG. 4 presents an exemplary password page. A member would be presented with this page after clicking on the first button 302 of the welcome page. The password page bears the title 400 of "Password Page." The password page has a first entry section 401 for the company password and a second entry section 402 for an individual password. The company password is the password for the company (generally a corporation or other business entity) having the account while the individual password is the password of the individual user associated with the company (generally an employee of the company) accessing the account.

Figures 5, 6:
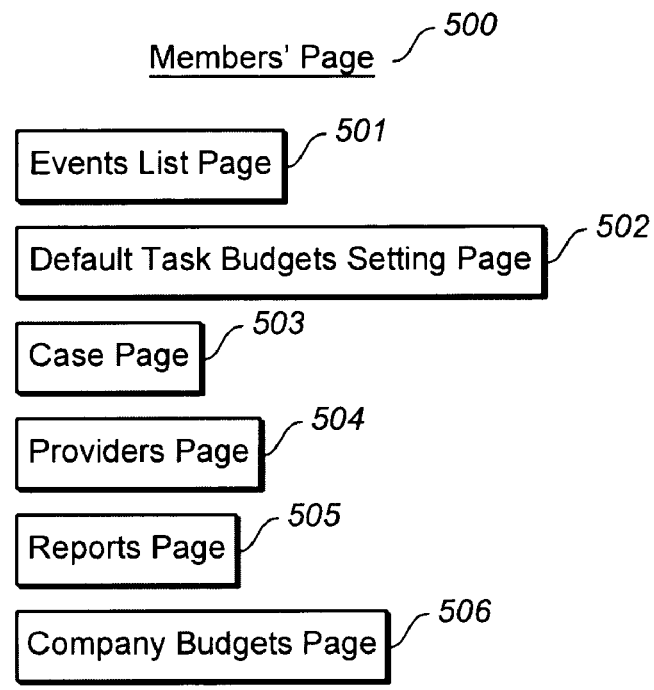
FIG. 5 is an exemplary members page.
FIG. 6 is an exemplary default task budgets setting page."

After both passwords are entered, the individual clicks on a send button 403. The passwords are then verified against a membership information database. If the company password entered matches the company password of a current company account, and the individual password entered matches the password of a individual authorized to access that account on behalf of the company, the user will be linked to a members' page, as illustrated by FIG. 5. Otherwise, the user will be invited to reenter and resubmit the passwords again.

FIG. 5 illustrates an exemplary members' page, which bears the title 500 of "Members' Page." The members' page shown herein includes buttons. The first button 501 links the user to an "Events List Page" that permits the user to review and/or revise generic event information. The second button 502 links the user to a "Default Task Budget Setting Page" that permits the user to review and/or revise generic task information. The third button 503 of the member's page is linked to a case page. The fourth button 504 of the member's page is linked to a providers page. The fifth button 505 links the user to a reports page. The sixth button 506 links the user to a company budgets page.

F. Event List Page.

The first button 501 of the member's page is linked to an events list page. The event list page allows the user to view and revise the company's event data. More specifically, it allows the user to modify the event engine database described above. Preferably the event list page provides a generic list of events. The list of events might include the following events among others:

"Authorized Preparation of Patent Application." The "Authorized Preparation of Patent Application" event concerns the preparation of a patent application is authorized. Generally, the in-house patent attorney is the individual who authorizes the preparation of a patent application.

"Patent Application Filed." The "Filing of Patent Application" event concerns a patent application is filed with the United States Patent and Trademark Office.

"First Non Final Office Action." A "First Non Final Office Action" event concerns a patent examiner issues a first non-final office action.

"Authorized Response to First Non Final Office Action." The "Authorized Response to First Non Final Office Action" event concerns a response to a first non-final office action is authorized. Typically, it is the in-house patent attorney that authorizes that task.

"Response to First Non Final Office Action Filed." The "Response to First Non Final Office Action Filed" event concerns a response to a first non-final office action is filed with the Patent Office. Generally, the outside patent attorney will prepare and file a response to a first non-final office action.

"Patent Issued." The "Patent Issued" event concerns a patent is issued by the U.S. Patent Office. Generally, patents are issued by the U.S. Patent Office on Tuesdays at 12:00 noon.

By clicking with a mouse a particular event on the event list page, or otherwise selecting the particular event, the user is linked to an event setting page corresponding to the event. The event setting page includes a plurality of fields or entries, each of which can be modified by the user. The event setting page allows the user to set what actions will be triggered in the system when the specific event occurs.

One of the innovative concepts of the present invention is that the occurrence of an event can put into play within the system both "Automated Response to Events"-type responses ("ARE") and "Automated Response to Action Items"-type responses ("ARAI"). An ARE is directly responsive to the occurrence of the event. In other words, when the triggering event occurs, the system automatically undertakes to perform the ARE.

An ARAI, on the other hand, is not directly responsive to the event. Instead, the event causes the ARAI to be set in the system, but the ARAI is performed only after the occurrence of some subsequent event or events. The occurrence of such a subsequent event might be, for example, the passage of a predetermined period of time. In the specific system described herein in connection with the management of patent prosecution, the occurrence of an event can put into play both AREs and ARAIs, as is shown more fully below.

The event setting page might have a multi-column list of responsive actions. Such columns might include "type of responsive action" and "description of responsive action." The types of responsive actions might include, for example, "add due date" or "delete due date." An "add due date" type responsive action causes they system to add a due date to the calendar database. A "delete due date" type responsive action deletes a due date from the calendar database. Such responsive actions are generally AREs.

Another type of responsive action might be to "queue memo." A "queue memo" type responsive action initiates a communication of some sort. The "queue memo" type responsive action can either be an ARE or an ARAI. For example, if the triggering event is to authorize preparation of a response to a first office action, the "queue memo" type responsive action might be to e-mail automatically an authorization to the outside patent attorney. In that instance, the "queue memo" action is an ARE. However, if the triggering event is the issuance of a first office action, the "queue memo" action might be to send a reminder to the outside patent attorney to file a response 30 days before the response is due. In that instance, the "queue memo" is an ARAI. The triggering event causes the system to set the reminder, but the reminder is not sent until 30 days before the response is due.

Specific event setting pages might list responsive actions as follows:

Actions Triggered by "Patent Application Filed" Event. The event setting page for the "Filing of Patent Application" event might list the following AREs:

1. Add due date for filing of status request (a status request is often filed with the Patent Office by the patent applicant if no action by the Patent Office has been taken after an undue amount of time);

2. Add due date for in-house patent attorney to approve payment of award to inventors; and 3. Add due date to file in foreign countries (if a patent application is filed in a foreign country within one year after it is filed with the U.S. Patent Office, the foreign country will generally give the patent application the benefit of the U.S. filing date).

Actions Triggered by "Authorized Preparation of Patent Application" Event. The event setting page for the "Authorized Preparation of Patent Application" event might list the following AREs:

1. Add a due date for receipt of a draft patent application from the outside patent attorney;

2. Communicate to the outside counsel authorization to prepare the patent application; and 3. Delete due date for the in-house patent attorney to authorize preparation of the patent application.

Actions Triggered By "First Non Final Office Action" Event. The event setting page for the "First Non Final Office Action" event might list the following AREs:

1. Add due date for response to office action without an extension;

2. Add due date for response to office action with a one-month extension;

3. Add due date for response to office action with a two-month extension;

4. Add due date for response to office action with a three-month extension; and

5. Add a due date for in-house attorney to authorize a response to the office action.

The event setting page for the "First Non Final Office Action" event might also list the following ARAIs:

1. Queue memo to send to outside patent attorney, 60 days before due date for response to office action without an extension, an e-mail reminder that a response is outstanding.

2. Queue memo to send to outside patent attorney and in-house patent attorney, 30 days before due date for response to office action without an extension, an e-mail reminder that a response is outstanding.

3. Queue memo to send to outside patent attorney, in-house patent attorney and primary contact at law firm, 7 days before due date for response to office action without an extension, a voice mail reminder that a response is outstanding.

4. Queue memo to send to outside patent attorney, in-house patent attorney and primary contact at law firm, 0 days before due date for response to office action without an extension, an e-mail reminder and a voice mail that a response is outstanding. Repeat sending reminder to outside patent attorney, in-house patent attorney and primary contact at law firm, every 5 days thereafter.

G. Default Task Budgets Setting Page.

The second button 502 links to a "Default Task Budgets Setting Page". The Default Task Budgets Setting Page permits the user to define default budget amounts associated with specific tasks. As shown in FIG. 6, preferably, the page presents a list 600 with three columns. The columns are a billing code column 601, a transaction description column 602, and an amount column 603. The task of preparing and filing a patent application might have an entry of "P-USP" 604 in the billing code column (short for "Prepare—United States Patent"), an entry of "Preparation and filing of original U.S. patent application" 605 in the transaction description column, and the amount of "$7,000" 606 in the amount column. As another example, the task of responding to a first non-final office action might have an entry of "P-OA1" 607 in the code column, an entry of "Preparation of response to first non-final office action" 608 in the transaction description column, and the amount of "$2,000" 609 in the amount column.

H. Case Page.

The third button 503 of the member's page is linked to a case page. The case page allows the user to view and revise the company's case information. Preferably the case page provides a plurality of fields. There might be fields, for example, for the title of the invention, the inventors' names, a company case or "docket" number, an outside law firm case or docket number, the filing date of a patent application, the Patent Office serial number for the patent application, the responsible in-house attorney, the responsible outside attorney, the responsible in-house paralegal, the abstract of the invention, the status of the case (e.g., whether the patent application is in preparation, pending in the Patent Office, allowed by the Patent Office, issued by the Patent Office, or abandoned), and any related cases.

Some of the fields may have a corresponding button. For example, the field for company case number might have a button next to it. If the user clicks on that button, a list of existing case numbers will be presented. If the user selects one of the case numbers from the list, the company case number will appear in the company case number field and the other fields will be filled in with information specific to that case. For example, if an outside patent counsel has already been selected, the field for outside patent counsel will be filled in by the system to identify the counsel. If the patent application in the case is pending before the Patent Office, the status field might be filled in by the system to state "Pending."

The case page might also have buttons that are not associated with any specific field on the page. For example, there might be a "costs" button. By selecting the "costs" button, the user is presented with an up-to-date report of all the costs and fees associated with the case. The report might reflect fees and costs that have been paid, fees and costs for which payment has been approved and fees and costs that have been authorized, thereby extracting data from the Authorization Database, the Approved Payment Database, and the Payment Database. Where an outside law firm has prepared and filed a patent application, the report might list the legal fees paid to outside counsel (e.g., fee for preparing and filing the patent application or fee for preparing and filing a response to an office action) and the reimbursed direct costs incurred in connection with the filing of the patent application (e.g., Patent Office filing fee or Patent Office assignment recordation fee).

Another button on the case page might be an "events" button. Selecting the events button might present a list of all the events associated with the prosecution of the patent application. Said list will be extracted by the system from the Global Events Database. Preferably, such an events list would be in chronological order. Events that might be shown on the list could include dates of Patent Office filings (e.g., date patent application filed or date response to office action filed), dates of Patent Office actions (e.g., Patent Office issues first office action or Patent Office issues notice of allowance), dates of authorization (e.g., date preparation of patent application is authorized or date draft patent application is received from outside patent counsel). Preferably, the events list comprises three columns, a column setting forth the date of the particular event, a column describing the event and a column for comments relating to the event.

I. Providers Page.

The fourth button 504 of the member's page is linked to a providers page. The providers page allows the user to view and revise the company's data relating to its outside providers. Here, the providers page provides a plurality of fields relating to the law firms that provide legal services in connection with respect to patent prosecution. Fields in the providers page might include law firm name, street address, telephone number, telefax number, and primary firm contact. Similar to the case page described above, a field on the providers page might have an associated button. For example, the law firm name field might have a button next to it, the selection of which provides a list of the company's law firms. If the user selects one of the law firms on the list, the fields will be filled in by the system accordingly.

The provider's page can also have other buttons. Other buttons might include a "case" button, an "attorneys" button and a "firm's budgets" button.

By clicking on the "case" button, the user is linked to a list of the cases assigned to the law firm. The user can click on a particular case from the list and will be linked to the case page with the fields filled in for information specific to that case.

By clicking on the "attorneys" button, the user is linked to a list of the attorneys from the law firm who work on company matters. The user can click on a particular attorney from the list and will be linked to a specific page for that attorney. The page associated with a particular attorney will provide a plurality of fields that includes entries for the attorney's name and communication information specific to that attorney, such as his or her e-mail address, direct telephone number and direct telefax number. The attorney page also has a "cases" button. By clicking on that button, the user is presented with a list of cases that are assigned to that particular attorney. Again, if one of the cases on the list of cases is selected, the user will be linked to the case page with the fields filled in for the specific case.

By clicking on the "firm's task budgets" button, the user is linked to a "firm's task budgets" page. The purpose of the "firm's task budgets" page is to set out the budgets negotiated with the specific law firm for generic tasks. Preferably, similar to the default task budgets page, there is a list with three columns, a billing code column, a transaction description column, and an amount column. The same codes and task descriptions used in the default task budgets page are also used in conjunction with the firm's task budgets page.

For example, the task of preparing and filing a patent application will have the entry "P-USP" in the code column and the entry "Preparation and filing of original U.S. patent application" in the transaction description column. Generally, however, the amount associated with the task will differ from the amount in the default task budgets page. The budget amount for the task of preparing and filing a patent application negotiated with the particular law firm might be more or less than the default budget amount of $7,000. Similarly, the task of responding to a first non-final office action might have an entry of "P-OA1" in the billing code column, an entry of "Preparation of response to first non-final office action" in the transaction description column, and the amount of "$2,500" in the amount column.

Each entry on the "firm's task budgets" page can be modified by the user. Also, new tasks and their associated budgets can be added or tasks from the list can be deleted by the user. Typically, the tasks listed in a "firm's task budgets" page will be a subset of the tasks listed in the "default task budgets" page.

J. Reports Page.

The fifth button 505 links the user to a reports page. The reports page has several buttons that will generate various reports. For example, there is a calendar button. Selecting the calendar button will link the user to a calendar page that allows the user to prepare a calendar report. For example, the user can generate a calendar that shows upcoming due dates with respect to the prosecution of patents. In generating a calendar report, the user can set certain parameters, such a generating a report showing due dates for only the next three months. The user can also make the report law firm specific, outside patent attorney specific or case specific.

The sixth button 506 links the user to a company budgets page. The budgets page allows the user to set company budgets, such as next year's budget for outside legal fees and costs for patent prosecution.

K. Operation of Authorization Procedure.

One operation of the present invention is that of authorizing the performance of defined tasks. In the setting of a patent prosecution management system designed in accordance with the present invention, an in-house patent attorney will be presented with a decision as to whether he or she should authorize the company's outside patent counsel to complete a task. For example, the in-house patent counsel might have to decide whether to authorize the outside patent attorney to respond to a first office action. Generally, the in-house patent attorney will review and analyze the office action, any prior art cited by the Patent Office, and the claims of the patent application in order to determine how to respond, if at all, to the office action. In reaching this decision, the in-house patent counsel might also consult with the outside patent attorney and/or the inventor.

In the preferred embodiment, if the in-house patent attorney decides to authorize a response to the office action, he or she will go to the case page, select the specific case with which he or she is concerned, and select the events button. Going to the end of the three-column list, there is an empty row. Clicking on the middle column, the in-house patent attorney is linked to a page that queries the type of action he wishes to take. One of the options is "authorize task." By selecting "authorize task", he or she is presented with a list of authorization events (these authorization events are listed in the event setting page). One of the authorization events listed is "Authorized Response to First Non Final Office Action."

By selecting that event, the in-house patent attorney is then presented with an authorization form on his or her computer screen. The form contains a plurality of data fields already filled in. These data fields include the law firm assigned to the case, the outside patent attorney assigned to the case, the budget amount authorized for the preparation and filing of the response to the office action. Each of these fields can be changed by the in-house attorney. If he or she changes the data fields that concern the law firm or the outside patent attorney, that data point will be changed in the system for the entire case.

If the in-house patent attorney changes the budget amount, the budget amount will be changed only for the specific task at hand (that is preparing and filing a response to the specific first office action in the particular case). It will not effect the firm task budgets database or the default task budgets database. The initial budget amount will be determined by the system as follows:

1. The system will check the firm task budgets database for the law firm assigned to the case for the amount corresponding to the task (here, the negotiated amount for the task of responding to a first office action);

2. if there is an amount specified in the firm task budgets database for the particular task, the amount reflected will be entered automatically into the budget field of the authorization form; and 3. if there is no amount specified in the firm task budgets database for the particular task, the system will then check the default task budgets database for the amount associated with the task and automatically enter into the budget field of the authorization form that amount.

The authorization form also has a comments section wherein the in-house patent attorney can type in a comment intended for the outside patent attorney. For example, the patent examiner might have rejected some of the patent claims in the patent application but indicated others are allowable. In the comment section, the in-house patent attorney might instruct the outside patent attorney to cancel the rejected claims and accept issuance of the non-rejected claims. Because the preparation of such a response is a simple matter, the in-house patent attorney might reduce the budget amount for the task by entering a different amount into the budget field.

The authorization form might also present a number of additional options to the in-house patent attorney. For example, there may be a query "E-mail authorization?" with a yes/no field next to it. Preferably, the yes/no field is filled in with a "yes" indicator by default, but the setting can be changed. There might also be a query "mail authorization?" also with a yes/no field next to it. That too has a default setting of "yes" but can be changed. In addition to the e-mail and air mail communications options, other methods of communication can be included as options, such as telefax and overnight air courier.

At the bottom of the authorization form there is an "authorize" button. After the in-house patent attorney is satisfied with the entries in the various fields, he or she selects the "authorize" button and is returned to the case events list. When the in-house patent attorney selects the authorize button, several responsive actions occur, including the following:

1. The global event database is updated to reflect that the authorization has been given to the outside patent attorney;

2. an e-mail is generated and sent to the outside patent counsel authorizing the preparation and filing of a response to the office action (the e-mail sets forth the budget amount as reflected by the authorization form at the time the in-house patent attorney selected the authorize button and includes the in-house patent attorney's comments);

3. a written memorandum confirming the authorization, together with the budget amount and comments, is printed at a printer proximate to the in-house paralegal assigned to the case (this is to be sent to the outside patent attorney by the paralegal);

4. the due date for the in-house patent attorney to authorize the response is deleted from the calendar database; and 5. the authorized budget database is updated with a new entry reflecting the specific case, task and budget amount authorized.

L. Operation of Due Date Event Procedure.

A due date type of response generally comes into play when data is input into the system by a user concerning an event that requires that some task be completed by a date certain in the future. A due date type response also generally triggers a set of actions within the system. Due dates can be in several forms, an artificial due date (act of authorizing outside patent attorney to file response to office action due within 14 days of issuance of office action by Patent Office), a soft due date (response to office action due three months after issuance of office action by Patent Office, but can be extended by payment of a fee), and a hard due date (if response to office action not filed in within six months after issuance of the office action by Patent Office, the patent application goes abandoned).

Typically, the due date type of response is an ARE. For example, if the in-house paralegal inputs into the system data reflecting the fact that the Patent Office has issued a first office action in a particular case, the system will automatically set appropriate due dates into the calendar database. Generally, when the in-house paralegal inputs the pertinent information, that information will include the date that office action was issued by the Patent Office. When the data is input, the system will check the date and enter due dates into the calendar database in accordance with the rules previously input into the system.

The input of the data indicating that the Patent Office has issued a first office action also automatically sets ARAls in the system. For example, when the issuance of the first office action is entered into the system, the system may set automatically the transmission of e-mail or voice mail reminders (e.g., to respond to the office action or to authorize a response to the office action) that will occur based on the mere passage of time.

Such reminders might be set to occur on specific dates. Generally, the user who previously programmed the system to send reminders in the first place will have set the system to calculate reminder dates based on a due date entered into the calendar database (e.g., send reminder 30 days prior to last day to file response without an extension) or based on the date the office action was issued (e.g., send reminder 60 days after the office action was issued by the Patent Office).

M. Budgeting.

The present invention also handles company budgeting. In the preferred embodiment, the present invention comprises a budget database. The budget database comprises a budget amount, entries for legal fees and costs that have been authorized, entries for legal fees and costs that have been approved for payment, and entries for legal fees and costs that have been paid.

The present invention allows users to generate reports regarding the budget. For example, an in-house patent attorney might input a budget amount for patent prosecution for Fiscal Year 2001. During the year, the in-house patent attorney can generate a report that shows the amount of the Fiscal Year 2001 budget that has been paid out for legal fees and costs, the amount of the budget that has been approved for payment, the amount of the budget that has been authorized for future work and costs but has not but not approved for payment, and the amount of the budget that has not been used or allocated. This allows the in-house patent attorney to easily determine what portion of the budget has not been already spent or already allocated for payment of authorized work.

M. Billing and Payment of Accounts Receivable.

A law firm, as well as any other type of service business will generally bill a client or customer for services rendered. In the preferred embodiment of the present invention, in the context of the rendering of patent prosecution services, a law firm will be paid a predetermined amount for the completion of a particular task.

For example, a law firm might be paid $7,000 for each patent application it prepares and files. Some patent applications may be simple and not require the time commensurate with a $7,000 fee. On the other hand, a patent application may be complicated and time consuming an a $7,000 fee may not reflect the substantial amount of work undertaken to complete the patent application. Hopefully, the complexity of the patent applications averages out such that a fee for $7,000 per patent application is satisfactory to both the company and the law firm.

Another approach may be for a law firm and a company to agree on a base amount for the filing of a patent application. For example, a law firm and company may agree. on a base amount of $6,000 per patent application. If, based on an invention disclosure, the preparation of a particular patent application appears complex, difficult and/or particularly time consuming, the in-house patent attorney and the primary contact at the law firm might negotiate a higher fee for the preparation and filing of that application.

Costs incurred in prosecuting patents also must be dealt with. For example, the Patent Office might require a patent applicant to pay a base filing fee (e.g., $710.00) to file a patent application. If the patent application has more than a certain number of independent claims (e.g., more than three independent claims), the Patent Office may require an additional filing fee for each extra independent claim (e.g., $80.00 per independent). And, if the patent application has more than a certain number of patent claims altogether (e.g., more than 20 claims), the Patent Office may also require an additional filing fee for each additional claim (e.g., $18.00 per claim). Generally, the law firm will pay the appropriate Patent Office filing fees when it files a patent application with the Patent Office. It will then bill the company for the amount of the filing fees paid to the Patent Office.

The present invention can be configured to handle these billing matters. In one embodiment, some or all of the following steps can be performed:

1. The default task budget database is prepared. The default task budget database has related entries for particular generic tasks with corresponding budget amounts and billing codes (e.g., "prepare and file patent application" for task—"$7,000.00" for task budget amount—"P-PATAPP" for billing code). Generally, the particular default task budget amounts are selected by one or more members of the company's patent department.

2. A firm task budget database is prepared for each law firm that performs patent prosecution services for the company. Like the default task budget database, each firm task budget database has related entries for generic tasks with corresponding budget amounts and billing codes (e.g., "prepare and file patent application" for task—"$7,500.00" for budget amount—"P-PATAPP" for billing code). Generally, a firm task budget database will have fewer entries than the default task budget database. In other words, the tasks addressed in a firm task budget database is usually a subset of the tasks addressed in the default task budget database. Typically, the particular task budget amounts in a firm task budget database are negotiated between the law firm and the company.

3. A cost budget database is prepared. The cost budget database has related entries for generic costs with corresponding budget amounts and billing codes (e.g., "filing fee for patent application" for cost—"$1,000.00" for budget amount—"PATFFEE" for billing code).

4. The company patent department receives an invention disclosure.

5. An in-house paralegal enters information concerning the invention disclosure into the computer system. The invention disclosure is assigned a case number (either by the in-house paralegal or automatically by the computer system), an in-house patent attorney and an in-house paralegal.

6. The company approves the filing of a patent application.

7. An in-house paralegal inputs into the computer system the approval to file a patent application.

8. The entry of the approval to file a patent application into the computer system automatically causes the computer system to set a due date in the calendar database for the in-house patent attorney to assign the case to a law firm.

9. The entry of the approval to file a patent application into the computer system automatically causes the computer system to transmit to the in-house patent attorney a notification to assign a law firm to the case.

10. The in-house patent attorney enters the computer system, inputs the case number into the computer system, and requests the system to present him or her with an electronic authorization form for authorizing the preparation and filing of a patent application.

11. In preparing the authorization form to the in-house patent attorney, the computer system extracts pertinent information previously input into the computer system concerning the case (such as title of the invention, case number, inventor, etc.) from the appropriate databases: The computer system might also check the cost budget database and extract the budget amount for paying the Patent Office the patent application filing fee.

12. The computer system presents the in-house patent attorney with the authorization form for authorizing the preparation and filing of a patent application. Entries for some of the fields are supplied by the computer system (such as title of the invention, inventor, billing code, and case number). A field for the Patent Office filing fee might also be extracted at this time. Other fields might be blank, such as law firm and legal fee budget for preparing and filing a patent application.

13. The in-house patent attorney selects a law firm by some method presented by the electronic authorization form, such as selecting the law firm from a list of law firms provided when a particular button is selected.

14. When the law firm is selected, the computer system checks the firm task budget database for the particular law firm. If the firm task budget database shows an amount for the task of preparing and filing a patent application, it automatically supplies that amount into the authorization form field for legal fee budget. If the law firm budget database does not have an amount for the task of preparing and filing a patent application, the computer system checks the default task budget database for an amount and, if the default task budget database has an amount for preparing and filing a patent application, the computer system automatically puts that amount into the field for legal fee budget.

15. The in-house patent attorney completes the form. He or she can change entries as deemed appropriate. The in-house patent attorney then submits the form to the computes system by clicking on an "authorized" button at the bottom of the form.

16. When the in-house patent attorney submits the form, the computer system automatically calculates a due date for the preparation of a draft patent application and enters the due date into the calendar database.

17. When the in-house patent attorney submits the form, the computer system automatically generates and sends an e-mail to the primary contact at the law firm authorizing the preparation and filing of the patent application. The information on the form includes the legal fee budget, the Patent Office filing fee budget, the case number, the inventor (including contact information), the assigned in-house patent attorney and paralegal, and the due date for preparing a draft application.

18. When the in-house patent attorney submits the form, the computer system automatically generates and prints out a memorandum to be sent to the law firm along with a copy of the invention disclosure.

19. When the in-house patent attorney submits the form, the computer system sets up an ARAIs to remind the outside patent attorney, on certain dates, to complete the draft patent application.

20. When the in-house patent attorney submits the form, the computer system notes in the budget database the amount that has been authorized for the legal fee and the amount that has been authorized for the Patent Office filing fee.

21. When the in-house patent attorney submits the form, the computer system notes in the authorization database the amount that has been authorized for the legal fee and the amount that has been authorized for the Patent Office filing fee.

22. The patent application is prepared and filed with the Patent Office.

23. The in-house paralegal inputs into the computer system data indicating that the patent application has been filed with the Patent Office.

24. When the in-house paralegal inputs the patent filing information into the computer system, the computer system automatically enters into the global event database the fact that the patent application has been filed with the Patent Office.

25. The law firm prepares and transmits a bill for the services rendered. Preferably, the bill is sent electronically. It can be in the form of an electronic spreadsheet file. It sets forth the billing code for preparing and filing a patent application, the case number and the legal fee for the service. It also sets forth the billing code for the Patent Office filing fee, the case number and the actual amount of the Patent Office filing fee.

26. The law firm's bill is input into the computer system.

27. The computer system checks the approved payment database to determine whether the amounts billed were previously approved for payment. If so, the computer system does not approve payment a second time and communicates the discrepancy to the in-house patent attorney for follow-up action.

28. The computer system checks the payment database to determine whether the amounts billed were previously paid. If so, the computer system does not approve payment a second time and communicates the discrepancy to the in-house patent attorney for follow-up action.

29. The computer system checks the authorization database to determine whether the amounts billed were previously authorized and checks the global events database to make sure that the patent application was in fact prepared and filed.

30. Assuming that the computer system determines that the patent application was in fact prepared and filed, if an amount billed is less than the amount that was authorized, the computer system will approve payment of the amount billed. This might occur where, for example, the amount authorized for a Patent Office filing fee was $1,000, but the actual amount paid to the Patent Office was $800. The computer system schedules an $800 payment and notes in the budget database that $800 is queued for payment. It also returns $200 to the unused portion of the budget. If a budget report is now generated, the $200 will be reflected as unused and the $800 will be reflected as approved for payment.

31. Assuming that the computer system determines that the patent application was in fact prepared and filed, if an amount billed is the same as the amount authorized, the computer system will approve payment of the amount billed. The computer system schedules the amount for payment and notes such in the budget database. If a budget report is now generated, the amount will be reflected as approved for payment.

32. Assuming that the computer system determines that the patent application was in fact prepared and filed, if an amount billed is more than the amount that was authorized, the computer system will not approve payment of the amount billed. This might occur where, for example, the amount authorized for a Patent Office filing fee was $1,000, but the actual amount paid to the Patent Office was $1,200. The computer system generates a communication to the in-house patent attorney and/or the in-house paralegal advising the more than the authorized amount has been billed. The in-house patent attorney or in-house paralegal can then investigate the situation and determine whether to pay the full amount of $1,200 or the $1,000 amount that was previously approved. If a budget report is generated before the situation is investigated, the $1,000 amount will still be reflected as authorized but not approved.

33. If the computer system determines that the patent application was not filed, the computer system will not approve payment of the amount billed. The computer system generates a communication to the in-house patent attorney and/or the in-house paralegal advising that an amount has been billed for a task that the computer system shows as incomplete. The in-house patent attorney or in-house paralegal can then investigate the situation and determine an appropriate course of action. If a budget report is generated before the situation is investigated and corrected, the amount that had been previously authorized is still reflected as authorized but not approved.

34. If payment is approved by the system, the Approved Payment Database is updated and the approval is forwarded for payment.

35. If payment is made, the Payment Database is updated.

Although the present invention has been described in detail with regard to the exemplary embodiments and drawings thereof, it should be apparent to those skilled in the art that various adaptations and modifications of the present invention may be accomplished without departing from the spirit and the scope of the invention. Accordingly, the invention is not limited to the precise embodiments shown in the drawings and described in detail above. Therefore, it is intended that all such variations not departing from the spirit of the invention be considered as within the scope thereof as limited solely by the claims appended hereto.

In the following claims, those elements which do not include the words "means for" are intended not to be interpreted under 35 U.S.C. § 112±6.

What is claimed is:

1. A method for operating a computer-based accounts payable system, said method comprising the steps of:
 a. receiving into said system an approval for authorizing a particular billing code of a first plurality of billing codes each having a first budget amount stored in a first database;
 b. determining whether said particular billing code is present in a second database comprising a second plurality of billing codes each having a second budget amount, wherein each of said second plurality of billing codes matches a corresponding one of said first plurality of billing codes;
 c. generating a communication from said system authorizing said second budget amount associated with said particular billing code in response to said particular billing code matching one of said second plurality of billing codes; and
 d. generating said communication authorizing said first budget amount associated with said particular billing code in response to said particular billing code matching none of said second plurality of billing codes.

2. The method of claim 1, wherein said particular billing code is associated with a task.

3. The method of claim 2, further comprising the step of: generating an authorization form for said task before determining whether said particular billing code is present in said second database.

4. The method of claim 3, further comprising the step of: calculating a due date for completion of said task.

5. The method of claim 4, further comprising the step of: automatically sending said authorization form with said due date to a selected firm.

6. The method of claim 5, further comprising the step of: entering one of said first budget amount and said second budget amount into a third database.

7. The method of claim 1, further comprising the step of: receiving a selection of a firm associated with said second budget database prior to determining whether said particular billing code is present in said second database.

8. A computer-based system for handling accounts payable, said system comprising:
 means for receiving an approval comprising a particular billing code of a first plurality of billing codes each having a first budget amount stored in a first database;
 means for determining whether said particular billing code is present in a second database comprising a second plurality of billing codes each having a second budget amount, wherein each of said second plurality of billing codes matches a corresponding one of said first plurality of billing codes;
 means for authorizing said second budget amount associated with said particular billing code in response to said particular billing code matching one of said second plurality of billing codes; and
 means for authorizing said first budget amount associated with said particular billing code in response to said particular billing code matching none of said second plurality of billing codes.

9. The system of claim 8, wherein said particular billing code is associated with a task.

10. The system of claim 9, further comprising:
 means for generating an authorization form for said task.

11. The system of claim 8, further comprising:
 means for receiving a selection of a firm associated with said second database.

12. The system of claim 10, further comprising:
 means for calculating a due date for completion of said task.

13. A computer-based system for handling accounts payable, said system comprising:
 means for receiving a bill comprising (i) a particular billing code of a first plurality of billing codes each having a first budget amount stored in a first database and (ii) a billing amount associated with said particular billing code;
 means for determining whether said particular billing code is present in a second database comprising a second plurality of billing codes, wherein each of said second plurality of billing codes matches a corresponding one of said first plurality of billing codes;
 means for approving payment of said billing amount in response to said particular billing code (i) matching none of said second plurality of billing codes and (ii)

not exceeding said first budget amount associated with said particular billing code; and means for approving payment of said billing amount in response to said particular billing code (i) matching one of said second plurality of billing codes and (ii) not exceeding a second budget amount associated with said particular billing code and stored in said second database.

14. The system of claim 13, further comprising:

means for receiving information into a third database that a task associated with said particular billing code has been completed.

15. The system of claim 14, further comprising:

means for checking said third database to determine whether said task has been completed before approving payment of said bill.

16. The system of claim 13, further comprising:

means for not approving payment in response to a corresponding one of said first budget amount and said second budget amount being less than said billing amount.

17. The system of claim 16, further comprising:

means for automatically generating a communication in response to not approving payment.

18. The system of claim 13, wherein said bill comprises an electronic spreadsheet.

19. The system of claim 13, further comprising:

means for approving payment of a corresponding one of said first budget amount and said second budget amount in response to said billing amount exceeding said corresponding one of said first budget amount and said second budget amount.

20. A method for operating a computer-based system for handling accounts payable, said method comprising the steps of:

a. receiving into said system a bill comprising (i) a particular billing code of a first plurality of billing codes each having a first budget amount stored in a first database and (ii) a billing amount associated with said particular billing code;

b. determining whether said particular billing code is present in a second database comprising a second plurality of billing codes, wherein each of said second plurality of billing codes matches a corresponding one of said first plurality of billing codes;

c. generating an approval from said system for payment of said billing amount in response to said particular billing code (i) matching none of said second plurality of billing codes and (ii) not exceeding said first budget amount associated with said particular billing code; and d. generating said approval from said system for payment of said billing amount in response to said particular billing code (i) matching one of said second plurality of billing codes and (ii) not exceeding a second budget amount associated with said particular billing code and stored in said second database.

21. The method of claim 20, further comprising the step of:

receiving information into a third database that a task associated with said particular billing code has been completed.

22. The method of claim 21, further comprising the step of:

checking said third database to determine whether said task has been completed before approving payment of said bill.

23. The method of claim 20, further comprising the step of:

not approving payment in response to a corresponding one of said first budget amount and said second budget amount being less than said billing amount.

24. The method of claim 20, wherein said bill comprises an electronic spreadsheet.

25. The method of claim 20, further comprising the step of:

approving payment of a corresponding one of said first budget amount and said second budget amount in response to said billing amount exceeding said corresponding one of said first budget amount and said second budget amount.

* * * * *